Sept. 19, 1939.  R. D. NYE ET AL  2,173,523
PROCESS OF OBTAINING URANIUM AND VANADIUM FROM THEIR ORES
Filed June 5, 1936
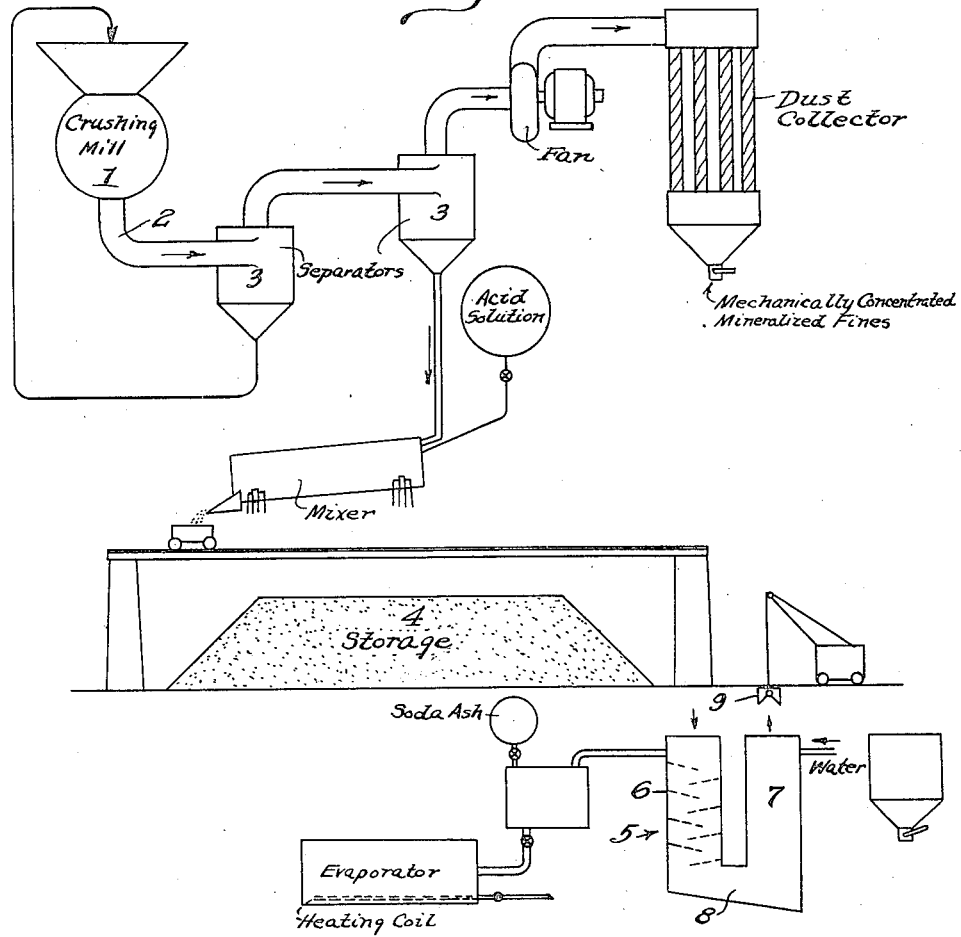
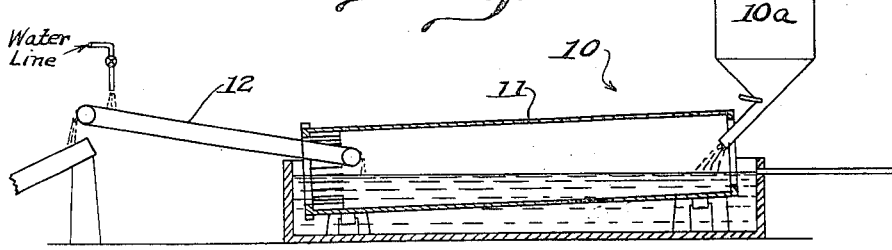
Inventors
Ralph D. Nye
Dana J. Demorest
By W. S. M. Powell
Attorney Patented Sept. 19, 1939

2,173,523

UNITED STATES PATENT OFFICE 2,173,523

PROCESS OF OBTAINING URANIUM AND VANADIUM FROM THEIR ORES

Ralph D. Nye and Dana J. Demorest, Columbus, Ohio, assignors to Utah Alloy Ores, Inc., Village of Thompsons, Utah, a corporation of Utah Application June 5, 1936, Serial No. 83,708

6 Claims. (Cl. 23—19)

Ores containing compounds of the elements uranium and vanadium, as found in the States of Colorado and Utah, consist principally of soft porous sandstone throughout which such compounds occur, especially among the silica grains of which the sandstone is formed. The surfaces and crevices of the silica crystals are impregnated with minerals containing oxides of uranium and vanadium. Among these minerals are Roscoelite and Carnotite.

The object of this invention is to provide a practical and economical method for processing such ores, whereby to concentrate the desired minerals and procure compounds of uranium and vanadium, the invention consisting in a novel procedure for separating the minerals containing oxides of uranium and vanadium from the mass of silica, and thus concentrating the amount of these oxides per unit of weight.

In accordance with the present invention, a part of the desired mineral compounds is obtained through mechanical treatment and other parts by chemical treatment and use is made, therefore, of a combined mechanical and chemical process. Such ores as mined contain generally about 2% or 3% of the metallic oxides of uranium and vanadium. By our improved process, we produce mechanically concentrates having 5% to 15% of the oxides of uranium and vanadium and through chemical action we obtain mixtures containing 15% to 45% of such uranium and vanadium oxides. The combined mechanical and chemical nature of the present process enables us to treat the ore at each step in a manner best adapted to its natural condition; also, we obtain these results with a minimum of equipment and chemicals.

For a further understanding of the invention, reference is to be had to the following description and the accompanying drawing, in which:

Fig. 1 is a diagrammatic view of apparatus employed in carrying out the present process;

Fig. 2 is a vertical sectional view through a modified form of washing machine.

In accordance with the present invention, the ore is sorted and dried, if necessary, and is then thoroughly broken up into small particles, which may be accomplished by feeding the ore into a crushing mill, such as a swing hammer pulverizer indicated at 1. Since any crushing operation produces a dust which contains much of the desired minerals, the crusher or pulverizer is provided with an air suction conduit 2 for the purpose of conveying the dust and crushed ore into a separator 3. By the employment of this suction system, we are enabled to collect all of the crushed material and pass it through the separator or separators 3 which sort the material into several classes.

The dust or very fine material, such, for instance, as would pass through a one hundred or one hundred and fifty mesh screen, is collected and suitably segregated to produce the mechanically concentrated mineralized fines. We find as a novel feature in this step of mechanical concentration, that the removal is effected of aluminous and organic materials from the ores, along with the uranium and vanadium minerals, so that the coarser residues are easily treated chemically to obtain the uranium or vanadium content thereof. In this concentrate composed of the fines of the pulverizing operation, there is present certain materials or alkaline substances which if present during chemical treatment would require extra amounts of an acid reagent to remove them and thus add to the cost of the process. However, by eliminating the alkaline substances with the concentrated fines, subsequent acid treatment of the remaining coarser particles is rendered economical and effective.

Having extracted the mineralized fine material from the crushed ore, we are thus enabled to use a chemical treatment for certain of the remaining coarser particles of the ore, which are known as tailings and range from about thirty or fifty mesh down to one hundred or one hundred and fifty mesh size.

It is well known that such ores may be treated with strong, concentrated acid reagents, such as sulphuric acid, or may be roasted with salt in order to recover the values. These operations require a large amount of chemicals and heat in order to secure satisfactory results. In accordance with the present process, we prepare these ores through the mechanical means described above so that they may be treated with a dilute acid solution and no artificial heat used whatever except the amount which may be generated by mixing the acid with water.

The selected sand or tailings remaining from the mechanical process is mixed with a dilute sulphuric acid solution until wetted. The amount of commercial strength 60° Baumé sulphuric acid used may vary from 5% to 10% of the weight of the tailings treated. Such an amount of acid is mixed with water so that the total solution used amounts to about 30% of the weight of the tailings with which the acid is to be used.

After thoroughly mixing the tailings with the acid solution, this mixture is conveyed to a storage place out of doors and piled as indicated at 4. The mixture is made and piled regularly as fast as the tailings are produced by the operation of the hammer mill or pulverizer and separators and, preferably, a large single pile is made so that heat resulting from the chemical action of the acid is retained within it. Also, by placing the mixture in a large storage pile, it retains its moisture, so that the chemical action between the acid and the minerals continues until substantially completed. The pile comprising the acid treated minerals is arranged so that the material may be kept in storage and aged for any desired length of time, such as twenty to ninety days or longer and, also, it is arranged so that the aged mixture may be removed from one end of the pile when a new mixture is being added to the other end. By such means, we secure satisfactory chemical action so that the minerals may be subjected to the following described washing treatment.

The acid acts upon the compounds of uranium and vanadium in the piled minerals to produce vanadyl sulphate and other compounds which are soluble in water. Therefore, when the acid treated minerals are sufficiently aged, they are removed from the pile indicated at 4 and conveyed to washing machines 5, where the mixture is washed with water preferably in a counter-current manner. These washing machines may consist of pairs of vertical tanks 6 and 7 which have their lower ends connected as at 8. The acid treated mineral mixture is dropped or otherwise introduced into the upper end of the first tank 6 and flows slowly downwardly through baffled or control passages through a rising current of water into the bottom of the second tank, indicated at 7. The washed mixture may then be picked up by a grab bucket 9 in the tank 7 and raised through a descending current of water until it is discharged from the upper end of the tank 7, or delivered to another pair of corresponding tanks for further washing.

Also, the washing may be done in a machine, as indicated at 10 in Fig. 2, consisting of a receiving hopper 10a where the acid treated minerals may be first mixed with water and stored for a period of several hours. The machine also includes an inclined drum or cylinder 11, partly submerged in a tank of water. The cylinder is rotated so that the acid treated mixture, when fed into the upper end thereof travels through the cylinder and is washed in the current of water moving through the cylinder in an opposed direction to that of the minerals. The washed minerals are discharged from the lower end of the cylinder onto an inclined belt conveyor 12, so arranged, that the water entering the tank flows downwardly on the belt over the washed minerals as the latter is being discharged from the machine.

Thus, by counter-current washing of the aged mixture of acid treated minerals, we obtain a solution containing compounds of uranium and vanadium and discharge the washed minerals with very little of these elements remaining in it.

By the combined mechanical and chemical steps, we are enabled to extract 80% to 90% of all the contained desired elements. The solution obtained by the washing operation is treated to precipitate the contained desired elements so that they may be removed from the solution, or the latter may be evaporated through heat treatment to separate said elements. Precipitation may be effected by treating the solution with soda ash or other suitable precipitating agent, such as hydrogen sulphide, until precipitation occurs.

What is claimed is:

1. The method of treating raw ores containing uranium and vanadium which comprises dry crushing such raw ores to a fine state of subdivision, mechanically removing from the crushed ores as a dry dust the finer particles of the crushed minerals together with acid neutralizing elements normally contained therein, and leaving a remainder consisting of crushed minerals sized to pass through a thirty mesh screen down to a hundred and fifty mesh screen, subjecting the said remaining minerals to treatment with dilute sulphuric acid, allowing the acid-treated minerals to age for at least 20 days until the chemical reactions secured by contact of the sulphuric acid therewith have been substantially completed, water washing the aged acid treated minerals to remove from the latter dissolved metals in solution with the washing water, and then subjecting the solution containing such metals to treatment for the removal and separation of the metal values therefrom.

2. The process of obtaining uranium and vanadium from their ores, which comprises the steps of subjecting such ore to a mechanical crushing operation, separating from the crushed minerals by a dry pneumatic separation the desired mineralized fines normally containing aluminous material and acid neutralizing elements therein, subjecting the remaining mineralized tailings only from such separation to a moistening and dampening treatment with an acid reagent, storing the dampened and moistened acid-treated tailings in piles for a sufficient time to age the same and enable the acid reagent to substantially fully chemically react with uranium and vanadium compounds present in such tailings, and washing the acid-treated minerals to remove in solution therefrom the desired metal values.

3. The process set forth in claim 2 in which the aged acid-treated minerals are washed with water in counter-current relationship.

4. The process set forth in claim 2 in which the tailings range from approximately 30 mesh down to approximately 100 mesh screen size.

5. The process set forth in claim 2 in which the acid tailings are stored in piles for a period of from 20 to 90 days.

6. The process set forth in claim 2 in which the solution of the desired metal values is treated to separate said values therefrom.

RALPH D. NYE.
DANA J. DEMOREST.